US010031671B2

(12) United States Patent
Wang et al.

(10) Patent No.: US 10,031,671 B2
(45) Date of Patent: Jul. 24, 2018

(54) METHOD, APPARATUS, AND SYSTEM FOR CALCULATING IDENTIFICATION THRESHOLD TO DISTINGUISH COLD DATA AND HOT DATA

(71) Applicant: Huawei Technologies Co., Ltd., Shenzhen (CN)

(72) Inventors: Chen Wang, Chengdu (CN); Yu Lin, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 15/173,456

(22) Filed: Jun. 3, 2016

(65) Prior Publication Data

US 2016/0283129 A1    Sep. 29, 2016

Related U.S. Application Data

(63) Continuation of application No. PCT/CN2014/088920, filed on Oct. 20, 2014.

(30) Foreign Application Priority Data

Dec. 5, 2013  (CN) .......................... 2013 1 0652334

(51) Int. Cl.
*G06F 12/00*   (2006.01)
*G06F 3/06*    (2006.01)

(52) U.S. Cl.
CPC ............ *G06F 3/0605* (2013.01); *G06F 3/061* (2013.01); *G06F 3/064* (2013.01); *G06F 3/067* (2013.01); *G06F 3/0617* (2013.01); *G06F 3/0649* (2013.01); *G06F 3/0653* (2013.01); *G06F 3/0685* (2013.01)

(58) Field of Classification Search
None
See application file for complete search history.

(56) References Cited

U.S. PATENT DOCUMENTS 8,315,995 B1   11/2012 Levy
2005/0251620 A1 11/2005 Matsunami et al.
(Continued)

FOREIGN PATENT DOCUMENTS

CN   101369451 A   2/2009
CN   102576293 A   7/2012
(Continued)

*Primary Examiner* — John A Lane
(74) *Attorney, Agent, or Firm* — Leydig, Voit & Mayer, Ltd.

(57) ABSTRACT

A method, an apparatus, and a system for calculating a identification threshold to distinguish cold data and hot data. The method includes: obtaining, according to a total capacity of hot data storage mediums, a size of data blocks, and the IO count statistical values on all the storage nodes and when the hot data storage mediums are filled with the data blocks corresponding to large IO count statistical values, a minimum IO count value in a count range corresponding to a minimum IO count statistical value in the large IO count statistical value, and using the minimum IO count value as a identification threshold to distinguish cold data and hot data. In the present invention, all storage nodes in a storage system, independently but cooperatively, implement hierarchical data storage in the entire storage system.

9 Claims, 7 Drawing Sheets

(56) References Cited

U.S. PATENT DOCUMENTS

| | | | |
|---|---|---|---|
| 2009/0049234 A1 | 2/2009 | Oh et al. | |
| 2011/0252210 A1 | 10/2011 | Davies et al. | |
| 2012/0185648 A1* | 7/2012 | Benhase | G06F 12/08 711/118 |
| 2012/0290779 A1 | 11/2012 | Eleftheriou et al. | |
| 2013/0205070 A1 | 8/2013 | Koseki et al. | |
| 2013/0311698 A1* | 11/2013 | Cheng | G06F 12/0246 711/103 |
| 2014/0359380 A1* | 12/2014 | Chiu | G06F 12/02 714/700 |
| 2015/0220438 A1* | 8/2015 | Chakalian | G06F 3/06 711/146 |
| 2016/0371195 A1* | 12/2016 | Kim | G06F 12/0653 |

FOREIGN PATENT DOCUMENTS

| | | |
|---|---|---|
| CN | 102799534 A | 11/2012 |
| CN | 102902628 A | 1/2013 |
| CN | 103246609 A | 8/2013 |
| CN | 103631538 A | 3/2014 |

\* cited by examiner

| | Statistics item 1: IO count | Statistics item 2: sequentiality | Statistics item 3: read/write ratio | ... | Statistics item n: ... |
|---|---|---|---|---|---|
| Statistics level 0 | Statistics item 1: IO count | Statistics item 2: sequentiality | Statistics item 3: read/write ratio | ... | Statistics item n: ... |
| Statistics level 1 | Statistics item 1: IO count | Statistics item 2: sequentiality | Statistics item 3: read/write ratio | ... | Statistics item n: ... |
| Statistics level 2 | Statistics item 1: IO count | Statistics item 2: sequentiality | Statistics item 3: read/write ratio | ... | Statistics item n: ... |
| Statistics level 3 | Statistics item 1: IO count | Statistics item 2: sequentiality | Statistics item 3: read/write ratio | ... | Statistics item n: ... |
| Statistics level 4 | Statistics item 1: IO count | Statistics item 2: sequentiality | Statistics item 3: read/write ratio | ... | Statistics item n: ... |
| Statistics level 5 | Statistics item 1: IO count | Statistics item 2: sequentiality | Statistics item 3: read/write ratio | ... | Statistics item n: ... |
| Statistics level 6 | Statistics item 1: IO count | Statistics item 2: sequentiality | Statistics item 3: read/write ratio | ... | Statistics item n: ... |
| Statistics level 7 | Statistics item 1: IO count | Statistics item 2: sequentiality | Statistics item 3: read/write ratio | ... | Statistics item n: ... |
| ... | ... | ... | ... | ... | ... |
| Statistics level m−2 | Statistics item 1: IO count | Statistics item 2: sequentiality | Statistics item 3: read/write ratio | ... | Statistics item n: ... |
| Statistics level m−1 | Statistics item 1: IO count | Statistics item 2: sequentiality | Statistics item 3: read/write ratio | ... | Statistics item n: ... |
| Statistics level m | Statistics item 1: IO count | Statistics item 2: sequentiality | Statistics item 3: read/write ratio | ... | Statistics item n: ... |

FIG. 4

METHOD, APPARATUS, AND SYSTEM FOR CALCULATING IDENTIFICATION THRESHOLD TO DISTINGUISH COLD DATA AND HOT DATA

CROSS-REFERENCE TO RELATED APPLICATIONS

This application is a continuation of International Patent Application No. PCT/CN2014/088920, filed on Oct. 20, 2014, which claims priority to Chinese Patent Application No. 201310652334.2, filed on Dec. 5, 2013, both of which are hereby incorporated by reference in their entireties.

TECHNICAL FIELD

The present invention relates to the field of data storage technologies, and in particular, to a method, an apparatus, and a system for calculating a identification threshold to distinguish cold data and hot data.

BACKGROUND

With development of storage technologies, people impose a higher requirement on a capacity and performance of a storage system, but a storage system with a large capacity and high performance is expensive. To meet, with a low price, performance and capacity requirements of the storage system, a hierarchical storage technology emerges.

A hierarchical storage technology of data is a mainstream technology that responds to a data lifecycle management requirement, and parameter values such as a data access frequency and an IO count may be recorded by monitoring service data. In a storage system, a tier at which the service data should be stored may be decided according to the monitored parameter values such as IO, where hot data may be migrated to a high performance tier in the storage system, and cold data may be migrated to a low performance tier in the storage system. Therefore, the performance and capacity requirements of the storage system may be met with a relatively low price.

The hierarchical storage technology mainly includes three parts: data monitoring, cold and hot data identification, and data migration. In the prior art, a data monitoring function module, a cold and hot data identification function module, and a data migration function module are distributed on storage nodes in a storage system, but the entire storage system has no uniform cold and hot identification criterion. Therefore, a hierarchical storage function can be implemented only on a single storage node in the storage system, and data cannot be migrated across storage nodes, which drastically reduces practicality and availability of the hierarchical storage function of the storage system.

SUMMARY

Embodiments of the present invention provide a method, an apparatus, and a system for calculating a identification threshold to distinguish cold data and hot data, so that all storage nodes in a storage system have a uniform cold and hot identification criterion, and can, independently but cooperatively, implement hierarchical data storage in the entire storage system, thereby improving practicality and availability of a hierarchical storage function of the storage system.

According to a first aspect, an embodiment of the present invention provides a method for calculating a identification threshold to distinguish cold data and hot data, where a storage control server is connected to multiple storage nodes, at least one of the storage nodes includes a hot data storage medium and a cold data storage medium, each storage node stores a data block, and the storage control server performs the following steps:

sending an IO statistical information query command for the data block to each storage node;

receiving IO statistical information sent by each storage node, where the IO statistical information includes at least one IO count field value, and a quantity of data blocks with an IO count value being in each count range that are on each storage node that sends the IO statistical information is recorded in each IO count field value;

performing an addition operation on IO count field values in a same count range in the received IO statistical information of all the storage nodes, to generate an IO count statistical value corresponding to each count range; and obtaining, according to a total capacity of hot data storage mediums, a size of the data blocks, and the IO count statistical values on all the storage nodes and when the hot data storage mediums are filled with the data blocks corresponding to large IO count statistical values, a minimum IO count value in a count range corresponding to a minimum IO count statistical value in the large IO count statistical value, and using the minimum IO count value as a identification threshold to distinguish cold data and hot data, where each IO count statistical value in the large IO count statistical values is not less than an IO count statistical value in a non-large IO count statistical value.

In a first possible implementation manner, the IO statistical information further includes at least one sequentiality field value, and a quantity of data blocks with a sequentiality value being in each sequentiality range that are on the storage node that sends the IO statistical information is recorded in each sequentiality field value.

According to the first possible implementation manner of the first aspect, in a second possible implementation manner, the method further includes: performing an addition operation on sequentiality field values in a same sequentiality range in the received IO statistical information of each the storage node, to generate a sequentiality statistical value corresponding to each sequentiality range; and the obtaining, according to a total capacity of hot data storage mediums, a size of the data blocks, and the IO count statistical values on all the storage nodes and when the hot data storage mediums are filled with the data blocks corresponding to large IO count statistical values, a minimum IO count value in a count range corresponding to a minimum IO count statistical value in the large IO count statistical value, and using the minimum IO count value as a identification threshold to distinguish cold data and hot data specifically includes: obtaining, according to the total capacity of the hot data storage mediums, the size of the data blocks, the IO count statistical values, and the sequentiality statistical values in the storage system and when the hot data storage mediums are filled with the data blocks corresponding to the large IO count statistical values, the minimum IO count value in the count range corresponding to the minimum IO count statistical value in the large IO count statistical value, and using the minimum IO count value as the identification threshold to distinguish cold data and hot data.

According to a second aspect, an embodiment of the present invention further provides a method for calculating a identification threshold to distinguish cold data and hot data, where a storage control server is connected to multiple storage nodes, at least one of the storage nodes includes a hot data storage medium and a cold data storage medium, each storage node stores a data block, and each storage node performs the following steps:

receiving an IO statistical information query command sent by the storage control server;

collecting statistics on an IO count in monitoring information of a data block on the local storage node in a segmented manner according to the IO statistical information query command, to obtain a quantity of data blocks with an IO count value being in each count range and use the quantity as an IO count field value;

sending the IO statistical information to the storage control server, where the IO statistical information includes at least one IO count field value; and receiving a identification threshold to distinguish cold data and hot data, sent by the storage control server, of a storage system, identifying hot data and cold data according to the identification threshold to distinguish cold data and hot data, and implementing hierarchical storage of the hot data and the cold data.

In a first possible implementation manner, the monitoring information further includes IO sequentiality of the data block or an IO read/write ratio of the data block, the sequentiality is a ratio of a sequential IO count to a total IO count of each data block, the IO read/write ratio is a ratio of a quantity of IO read operations to a quantity of IO write operations of each data block, and the IO statistical information further includes at least one sequentiality field value, where a quantity of data blocks with a sequentiality value being in each sequentiality range that are on the local storage node is recorded in each sequentiality field value.

According to the first possible implementation manner of the second aspect, in a second possible implementation manner, the collecting statistics on an IO count in monitoring information of a data block on the local storage node in a segmented manner, to obtain a quantity of data blocks with an IO count value being in each count range and use the quantity as an IO count field value specifically includes: collecting statistics on the IO count of the data block on the local storage node according to the IO read/write ratio, to obtain each IO count field value in the IO statistical information.

According to the second possible implementation manner of the second aspect, in a third possible implementation manner, the collecting statistics on the IO count of the data block on the local storage node according to the IO read/write ratio, to obtain each IO count field value in the IO statistical information specifically includes: calculating IO count values of the data block according to a quantity of IO accesses of the data block and the IO read/write ratio; acquiring a maximum IO count M of the data block on the local storage node; determining a quantity N of IO count field values; performing a division operation on the maximum IO count M and the quantity N of IO count field values to obtain the count range; and collecting statistics on a quantity of data blocks in each count range to obtain the N IO count field values.

According to a third aspect, an embodiment of the present invention provides a storage control server, where the storage control server is connected to multiple storage nodes, at least one of the storage nodes includes a hot data storage medium and a cold data storage medium, each storage node stores a data block, and the storage control server includes:

a sending unit, configured to send an IO statistical information query command for the data block to each storage node;

a receiving unit, configured to receive IO statistical information sent by each storage node, where the IO statistical information includes at least one IO count field value, and a quantity of data blocks with an IO count value being in each count range that are on the storage node that sends the IO statistical information is recorded in each IO count field value;

a generating unit, configured to perform an addition operation on IO count field values in a same count range in the received IO statistical information of all the storage nodes, to generate an IO count statistical value corresponding to each count range; and a determining unit, configured to obtain, according to a total capacity of hot data storage mediums, a size of the data blocks, and the IO count statistical values on all the storage nodes and when the hot data storage mediums are filled with the data blocks corresponding to large IO count statistical values, a minimum IO count value in a count range corresponding to a minimum IO count statistical value in the large IO count statistical value, and use the minimum IO count value as a identification threshold to distinguish cold data and hot data, where each IO count statistical value in the large IO count statistical values is not less than an IO count statistical value in a non-large IO count statistical value.

In a first possible implementation manner, the IO statistical information further includes at least one sequentiality field value, and a quantity of data blocks with a sequentiality value being in each sequentiality range that are on the storage node that sends the IO statistical information is recorded in each sequentiality field value.

According to the first possible implementation manner of the third aspect, in a second possible implementation manner, the generating unit is further configured to perform an addition operation on sequentiality field values in a same sequentiality range in the received IO statistical information of each the storage node, to generate a sequentiality statistical value corresponding to each sequentiality range; and the determining unit is specifically configured to obtain, according to the total capacity of the hot data storage mediums, the size of the data blocks, the IO count statistical values, and the sequentiality statistical values in the storage system and when the hot data storage mediums are filled with the data blocks corresponding to the large IO count statistical values, the minimum IO count value in the count range corresponding to the minimum IO count statistical value in the large IO count statistical value, and use the minimum IO count value as the identification threshold to distinguish cold data and hot data.

According to a fourth aspect, an embodiment of the present invention provides a storage node, where a storage control server is connected to multiple storage nodes, at least one of the storage nodes includes a hot data storage medium and a cold data storage medium, each storage node stores a data block, and each storage node includes:

a receiving unit, configured to receive an IO statistical information query command sent by the storage control server;

a statistics collection unit, configured to collect statistics on an IO count in monitoring information of a data block on the local storage node in a segmented manner according to the IO statistical information query command, to obtain a quantity of data blocks with an IO count value being in each count range and use the quantity as an IO count field value;

a sending unit, configured to send the IO statistical information to the storage control server, where the IO statistical information includes at least one IO count field value; where the receiving unit is further configured to receive a identification threshold to distinguish cold data and hot data, sent by the storage control server, of a storage system; and an implementation unit, configured to: receive the identification threshold to distinguish cold data and hot data, sent by the storage control server, of the storage system, identify hot data and cold data according to the identification threshold to distinguish cold data and hot data, and implement hierarchical storage of the hot data and the cold data.

In a first possible implementation manner, the monitoring information further includes IO sequentiality of the data block or an IO read/write ratio of the data block, the sequentiality is a ratio of a sequential IO count to a total IO count of each data block, the IO read/write ratio is a ratio of a quantity of IO read operations to a quantity of IO write operations of each data block, and the IO statistical information further includes at least one sequentiality field value, where a quantity of data blocks with a sequentiality value being in each sequentiality range that are on the local storage node is recorded in each sequentiality field value.

According to the first possible implementation manner of the fourth aspect, in a second possible implementation manner, the statistics collection unit is specifically configured to collect statistics on the IO count of the data block on the local storage node according to the IO read/write ratio, to obtain each IO count field value in the IO statistical information.

According to the second possible implementation manner of the fourth aspect, in a third possible implementation manner, a process in which the statistics collection unit obtains each IO count field value in the IO statistical information by means of statistics specifically includes: calculating IO count values of the data block according to a quantity of IO accesses of the data block and the IO read/write ratio; acquiring a maximum IO count M of the data block on the local storage node; determining a quantity N of IO count field values; performing a division operation on the maximum IO count M and the quantity N of IO count field values to obtain the count range; and collecting statistics on a quantity of data blocks in each count range to obtain the N IO count field values.

According to the fifth aspect, an embodiment of the present invention provides a storage system, where the system includes the foregoing storage control server and the multiple storage nodes described above.

According to the method, the apparatus, and the system for calculating a identification threshold to distinguish cold data and hot data provided in the embodiments of the present invention, a identification threshold to distinguish cold data and hot data of an entire storage system may be obtained by collecting statistics on and calculating monitoring information that is within a time period and is of each storage node in the storage system. Therefore, all the storage nodes in the storage system have a uniform cold and hot identification criterion, and can, independently but cooperatively, implement hierarchical data storage in the entire storage system, and data migration across storage nodes in the storage system may be implemented, which makes full use of performance advantages of all high performance storage mediums in the entire storage system, and meets, with a relatively low price, performance and capacity requirements of the storage system.

BRIEF DESCRIPTION OF DRAWINGS

FIG. 4 is a schematic diagram of a statistical result of data on a storage node according to an embodiment of the present invention;

DESCRIPTION OF EMBODIMENTS

In the following description, specific details such as a particular system structure, an interface, and a technology are set forth in an illustrative but not a restrictive sense to make a thorough understanding of the present invention. However, a person skilled in the art should know that the present invention may also be implemented in other embodiments without these specific details. In other cases, detailed descriptions of well-known apparatuses, circuits, and methods are omitted, so that the present invention is described without being obscured by unnecessary details.

Figure 1:
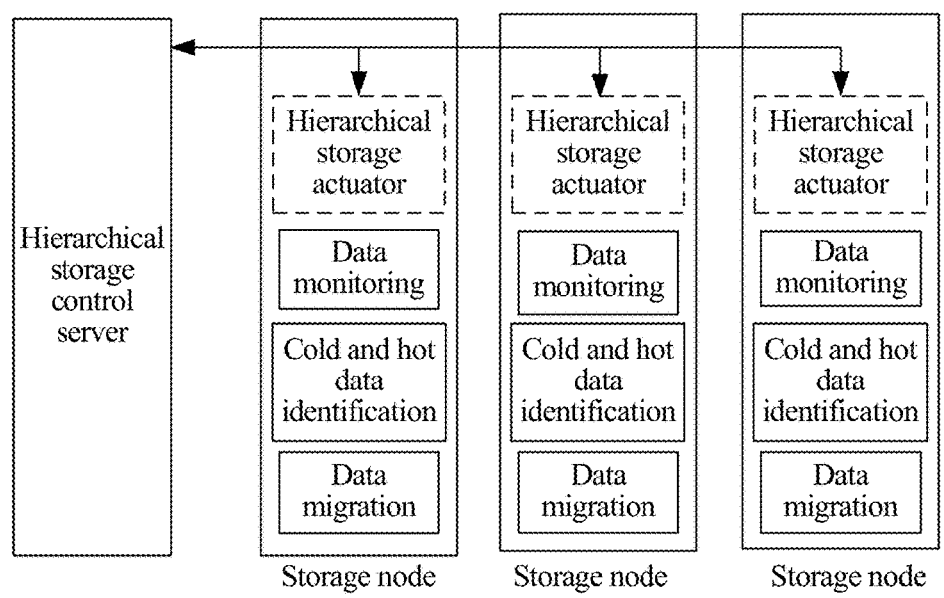
FIG. 1 is a schematic diagram of a storage system according to an embodiment of the present invention.

A method for calculating a identification threshold to distinguish cold data and hot data provided in an embodiment of the present invention may be applied to a storage system shown in FIG. 1. As shown in FIG. 1, the storage system provided in this embodiment of the present invention includes a storage control server and multiple storage nodes, where the storage control server and the storage system form a network, and after the network is formed, the storage control server can communicate with each storage node in the storage system. The storage control server may send an IO statistical information query command to a data monitoring program on each storage node, and the data monitoring program obtains IO statistical information with a relatively small data volume after collecting statistics on IO information of a host of the storage node in a segmented manner, and then feeds the information back to the storage control server, so that the storage control server determines a identification threshold to distinguish cold data and hot data of the entire storage system and then feeds the threshold back to the storage nodes. Each storage node identifies cold and hot data according to the identification threshold to distinguish cold data and hot data, and then implements hierarchical data storage. Therefore, all the storage nodes in the storage system, independently but cooperatively, implement hierarchical data storage in the entire storage system, thereby improving practicality and availability of a hierarchical storage function of the storage system. It should be noted that, in the storage system, the storage control server may be located on a storage node, or may be independently located on a functional entity. In addition, an executor program may be independently configured on each storage node and is used to exchange information with the storage control server; or certainly, the executor program may not be configured, and the storage control server exchanges information with a data monitoring program, a cold and hot data identification program, and a data migration program on the storage node.

Figure 2:
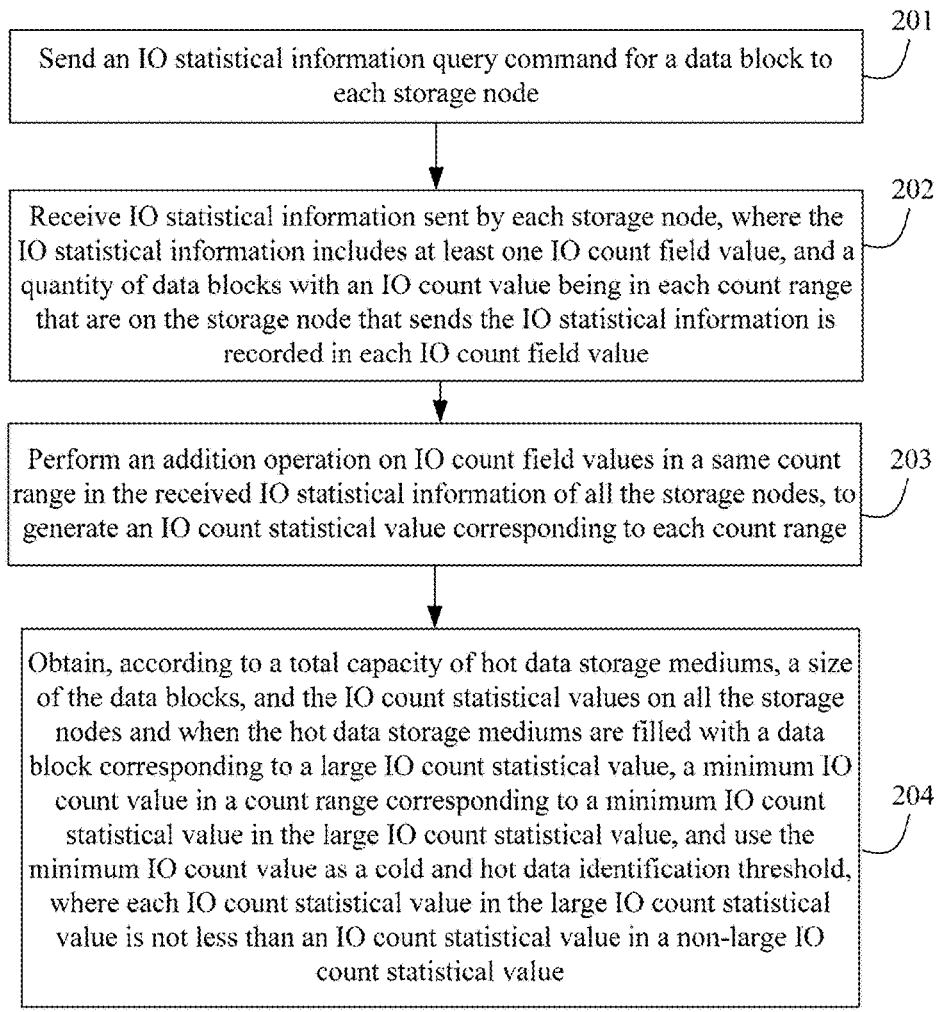
FIG. 2 is a flowchart of a method for calculating a identification threshold to distinguish cold data and hot data according to an embodiment of the present invention.

FIG. 2 is a flowchart of a method for calculating a identification threshold to distinguish cold data and hot data according to an embodiment of the present invention. This embodiment is executed by a storage control server, where the storage control server is connected to multiple storage nodes, at least one of the storage nodes includes a hot data storage medium and a cold data storage medium, and each storage node stores a data block. A method for determining a identification threshold to distinguish cold data and hot data of an entire storage system by the storage control server is described in detail in this embodiment. As shown in the figure, the storage control server may perform the following steps:

Step 201: Send an IO statistical information query command to each storage node in the multiple storage nodes.

In the storage system provided in this embodiment of the present invention, the storage control server may be located on a storage node, or may be independently located on a functional entity. In addition, a hierarchical storage executor program may be independently configured on each storage node and is used to communicate with the storage control server; or certainly, the executor program may not be configured, and the storage control server communicates with a data monitoring program, a cold and hot data identification program, and a data migration program on the storage node.

A storage system in which no hierarchical storage executor is configured on each storage node is used as an example in this embodiment of the present invention, to describe a technical solution of the present invention. However, the technical solution provided in this embodiment of the present invention is also applicable to the foregoing storage system in which the hierarchical storage executor is configured.

After the storage control server and the storage system form a network, the storage control server can communicate with a hierarchical storage executor on each storage node in the storage system. The storage control server determines time to send the IO statistical information query command to the hierarchical storage executor, and then determines a cold and hot data identification criterion of the entire storage system according to IO statistical information fed back by each storage node.

A hierarchical storage executor program, a data monitoring program, a cold and hot data identification program and a data migration program all work inside a storage node, and have no relationship with another storage node. After a storage node receives host IO, the host IO does not need to be forwarded to another storage node, and is directly intercepted by a data monitoring program on the storage node, to generate corresponding monitoring information. Therefore, efficiency of hierarchical data storage is greatly improved.

Step 202: Receive IO statistical information sent by each storage node, where the IO statistical information includes at least one IO count field value, and a quantity of data blocks with an IO count value being in each count range that are on the storage node that sends the IO statistical information is recorded in each IO count field value.

The IO statistical information includes multiple fields, where each field includes at least one field value. Each field may be implemented in a form of an array, and each field value is each array element in the array; or each field may be implemented in a form of a table, and each field value is content of each cell in the table. FIG. 4 is a schematic diagram of a statistical result of data on a storage node according to an embodiment of the present invention, and a statistical result in a form of a table is given in FIG. 4.

After receiving the IO statistical information query command, the storage control server of each storage node may instruct a data monitoring program to collect statistics on monitored IO information of a host in a segmented manner, to generate a statistical result with a relatively small data volume, that is, the IO statistical information. The information may reflect a general cold and hot data distribution status of the storage node.

Specifically, the storage node may collect statistics on an IO count and on sequentiality in monitoring information, to obtain the general cold and hot data distribution status of the storage node. That a field is implemented in a form of an array is used as an example in the following to describe a process in which an IO count field value in statistical information is obtained according to an IO count of a data block in monitoring information.

A maximum IO count value of each data block on the storage node is M, and when statistics is collected in a segmented manner, an array in which a quantity of elements is M may be created (a specific implementation manner is not limited), and monitoring information of the storage node is traversed. For example, if a quantity of data blocks with an IO count being 1 that are on the storage node is N1, a value of Array[0] is set to N1; if a quantity of data blocks with an IO count being 2 that are on the storage node is N2, a value of Array[2-1] is set to N2; . . . ; if a quantity of data blocks with an IO count being n that are on the storage node is Nn, a value of Array[n-1] is set to Nn; . . . ; if a quantity of data blocks with an IO count being M that are on the storage node is Nm, a value of Array[M-1] is set to Nm. After the monitoring information is traversed once, each value recorded in the array may reflect the cold and hot data distribution status on the storage node.

In the storage system, some data blocks may be extremely hot, and an IO count value is extremely large, that is, M is an extremely large value. Because of a limitation of resources and a limitation of calculation performance, it is inappropriate to create an array in which a quantity of elements is M. The algorithm described above may be improved in the following specific manner:

When the storage node acquires an array in statistical information, each array element may be corresponding to one IO count interval, that is, an IO count value being in a range is corresponding to one array element. A size of the range may be determined according to a maximum IO count value M in the storage system and a quantity N of array elements. A size of the IO count interval is M/N, which is marked as T (abbreviation of the English word "interval"). Each array element is corresponding to an IO count interval whose size is T, that is, a quantity of data blocks with an IO count being in [1, T) is recorded in an element Array[0], a quantity of data blocks with an IO count being in [T, 2T) is recorded in an element Array[1], . . . , and a quantity of data blocks with an IO count being in [(N-1)*T, N*T) is recorded in an element Array[N-1]. After the monitoring information is traversed once, the array may be used to reflect the cold and hot data distribution status on the storage node.

The foregoing is a method for calculating each IO count field value, where statistics on a sequentiality field and an IO read/write ratio may also be collected by using the foregoing method, to obtain each corresponding value.

During calculation of each IO count field value, calculation may be performed with reference to the IO read/write ratio. For example, if data write consumption of a data block is P times data read consumption of the data block, an equivalent quantity of IO read times may be calculated according to the read/write ratio and a quantity of IO accesses, and during subsequent calculation of the threshold, this equivalent quantity of IO times is used to perform calculation. Certainly, a factor of the read/write ratio may also not be considered, and each IO count field value is calculated only according to the quantity of IO accesses.

In this way, after the IO statistical information is obtained, the IO statistical information may be sent to the storage control server in the form described in FIG. 4.

Step 203: Perform an addition operation on IO count field values in a same count range in the received IO statistical information of all the storage nodes, to generate an IO count statistical value corresponding to each count range.

After receiving the IO statistical information of all the storage nodes, the storage control server may combine the statistical information of all the storage nodes, and calculate the identification threshold to distinguish cold data and hot data of the entire storage system.

Specifically, a method for combining the statistical information of all the storage nodes to obtain IO statistical information of the entire storage system is as follows: the storage control server may combine arrays Arrays returned by all the storage nodes, and a combining process is to create an array CArray in which a total quantity of elements is M. A value of each element in the CArray is a sum of values of elements corresponding to the Array returned by each storage node. It should be noted that, IO count statistics is used herein as a simple example for description, and how to generate a value of an element in the CArray by using multiple Arrays is determined by an implementer according to a specific requirement.

Step 204: Obtain, according to a total capacity of hot data storage mediums, a size of the data blocks, and the IO count statistical values on all the storage nodes and when the hot data storage mediums are filled with the data blocks corresponding to a large IO count statistical value, a minimum IO count value in a count range corresponding to a minimum IO count statistical value in the large IO count statistical value, and use the minimum IO count value as a identification threshold to distinguish cold data and hot data, where each IO count statistical value in the large IO count statistical values is not less than an IO count statistical value in a non-large IO count statistical value.

A purpose of identifying coldness and hotness of data is to migrate hot data to a high performance tier and place cold data to a low performance tier. If a capacity of the high performance tier can store X data blocks, X hottest data blocks are identified by using the threshold and placed in a hot data storage medium, and the other data blocks are placed in a cold data storage medium. Therefore, the capacity of the high performance tier and a size of data blocks that can be accommodated may be queried, and a quantity of data blocks that can be stored at the high performance tier is calculated.

Coldness and hotness of the data may be measured by using an IO count value, where a data block corresponding to large IO count statistical values is a hot data block, and a data block corresponding to a non-large IO count statistical values is a cold data block.

However, in actual implementation, it is not limited to use the IO count value to measure coldness and hotness of the data in the storage system, and a combination of multiple IO parameter values may be used. For example, an IO count threshold and the foregoing sequentiality value may be used together as a criterion for determining coldness and hotness of the data.

If arrays are traversed in descending order of subscripts in the CArray in the foregoing total statistical information, a subscript Index can be found, so that CArray[Index]+CArray[Index+1]+ . . . +CArray[M−1]=X. Therefore, an IO count value corresponding to the subscript Index may be used as the minimum IO count statistical value in the large IO count statistical value, that is, used as the identification threshold to distinguish cold data and hot data. If one array element is corresponding to one IO count interval and a minimum IO count value is to be determined according to the foregoing method for determining the minimum IO count statistical value, only an IO count interval corresponding to the minimum IO count statistical value can be determined, and a specific value cannot be determined. For example, only that the IO count threshold is in the IO count interval [T, 2T] can be determined, and a specific value cannot be determined. To determine the minimum IO count statistical value, an array Array2 (one element in the Array2 is corresponding to one sub-interval of the interval [T, 2T]) needs to be created, and statistics about a quantity of data blocks with a monitored count being in the interval [T, 2T] is collected into the Array2. If the threshold still cannot be precisely determined by combining the Array and the Array2, a new array may be continually created to collect statistics in a more precisely segmented manner, until the minimum IO count statistical value can be precisely determined.

Correspondingly, when combination of statistics collected in a segmented manner is performed by a hierarchical storage control center, combination of only arrays Arrays returned by storage nodes is not enough, an array sequence Array, Array2, Array3 . . . needs to be combined. An array sequence obtained after combination is used to finally determine the cold and hot identification threshold of the entire storage system.

The method provided in this embodiment of the present invention further includes: performing an addition operation on sequentiality field values in a same sequentiality range in the received IO statistical information of each the storage node, to generate a sequentiality statistical value corresponding to each sequentiality range.

Storage mediums with different attributes have different requirements for an IO sequentiality value. Therefore, a sequentiality threshold may be determined first according to attribute information of storage mediums in the storage system, that is, data may be placed in the hot data storage medium when a sequentiality value is greater than a value, where the value is determined according to sizes of various types of storage mediums in the storage system. If a solid-state disk in the storage system is relatively large, a relatively small sequentiality threshold may be set.

The IO count value used to measure coldness and hotness of the data is an extremely direct measurement criterion, and the IO count threshold is a criterion for determining coldness and hotness of the data. If the IO count threshold is an IO count value T, a data block with an IO count value being greater than T is hot data and should be placed in the hot data storage medium; if a data block with an IO count value being less than T, the data block is considered as cold data and should be placed in the cold data storage medium.

The storage control server sends the identification threshold to distinguish cold data and hot data obtained by means of calculation to the hierarchical storage executor of each storage node, and delivers a cold and hot data identification command and a data migration command to the hierarchical storage executor. The hierarchical storage executor transmits the received threshold to the cold and hot data identification program of the storage node. According to the threshold, the cold and hot data identification program analyzes monitoring information of a local host, and then identifies hot data and cold data. Then, the hierarchical storage executor instructs the data migration program to migrate the hot data to the hot data storage medium and migrate the cold data to the cold data storage medium.

Data migration may be performed inside the storage node, or may be performed in the entire storage system.

In this way, according to this embodiment of the present invention, a identification threshold to distinguish cold data and hot data of an entire storage system may be obtained by collecting statistics on and calculating monitoring information that is within a time period and is of each storage node in the storage system. Therefore, all the storage nodes in the storage system have a uniform cold and hot identification criterion, and can, independently but cooperatively, implement hierarchical data storage in the entire storage system, and data migration across storage nodes in the storage system may be implemented, which makes full use of performance advantages of all high performance storage mediums in the entire storage system, and meets, with a relatively low price, performance and capacity requirements of the storage system.

Figure 3:
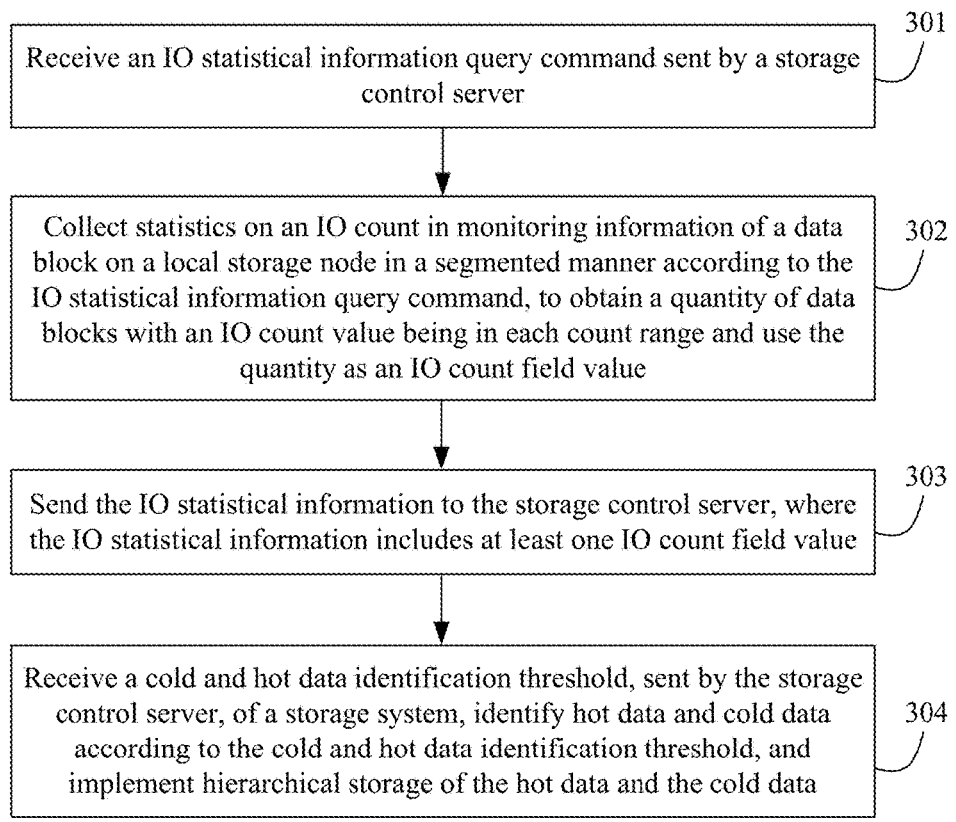
FIG. 3 is a flowchart of another method for calculating a identification threshold to distinguish cold data and hot data according to an embodiment of the present invention.

FIG. 3 is a flowchart of another method for calculating a identification threshold to distinguish cold data and hot data according to an embodiment of the present invention. This embodiment is executed by a storage node, where the storage node is connected to a storage control server, at least one of the storage nodes includes a hot data storage medium and a cold data storage medium, each storage node stores a data block, and each storage node performs the following steps. As shown in the figure, the storage node performs the following steps:

Step 301: Receive an IO statistical information query command sent by the storage control server.

In a storage system provided in this embodiment of the present invention, the storage control server may be located on a storage node, or may be independently located on a functional entity. In addition, a hierarchical storage executor program may be independently configured on each storage node and is used to communicate with the storage control server; or certainly, the executor program may not be configured, and the storage control server communicates with a data monitoring program, a cold and hot data identification program, and a data migration program on the storage node.

A storage system in which no hierarchical storage executor is configured on each storage node is used as an example in this embodiment of the present invention, to describe a technical solution of the present invention. However, the technical solution provided in this embodiment of the present invention is also applicable to a storage system in which a hierarchical storage executor is configured.

To achieve a uniform cold and hot identification criterion in the entire storage system, after the storage control server and the storage system form a network, the storage control server can communicate with a hierarchical storage executor on each storage node in the storage system, and determines time by itself to send the IO statistical information query command to the hierarchical storage executor, to acquire IO statistical information of a host on each storage node, so that the storage node can receive the IO statistical information query command.

Step 302: Collect statistics on an IO count in monitoring information of a data block on the local storage node in a segmented manner according to the IO statistical information query command, to obtain a quantity of data blocks with an IO count value being in each count range and use the quantity as an IO count field value.

After receiving the IO statistical information query command, the storage control server of each storage node may instruct a data monitoring program to collect statistics on monitored IO information of a host in a segmented manner, to generate a statistical result with a relatively small data volume, that is, IO statistical information. The IO statistical information includes multiple fields, where each field includes at least one field value. Each field may be implemented in a form of an array, and each field value is each array element in the array; or each field may be implemented in a form of a table, and each field value is content of each cell in the table. FIG. 4 is a schematic diagram of a statistical result of data on a storage node according to an embodiment of the present invention, and a statistical result in a form of a table is given in FIG. 4. The information may reflect a general cold and hot data distribution status of the storage node. Specifically, the storage node may collect statistics on an IO count and on sequentiality in monitoring information, to obtain the general cold and hot data distribution status of the storage node. That a field is implemented in a form of an array is used as an example in the following to describe a process in which an IO count field value in statistical information is obtained according to an IO count of a data block in monitoring information.

A maximum IO count value of each data block on the storage node is M, and when statistics is collected in a segmented manner, an array in which a quantity of elements is M may be created (a specific implementation manner is not limited), and monitoring information of the storage node is traversed. For example, if a quantity of data blocks with an IO count being 1 that are on the storage node is N1, a value of Array[0] is set to N1; if a quantity of data blocks with an IO count being 2 that are on the storage node is N2, a value of Array[2-1] is set to N2; . . . ; if a quantity of data blocks with an IO count being n that are on the storage node is Nn, a value of Array[n-1] is set to Nn; . . . ; if a quantity of data blocks with an IO count being M that are on the storage node is Nm, a value of Array[M-1] is set to Nm. After the monitoring information is traversed once, each value recorded in the array may reflect the cold and hot data distribution status on the storage node.

In the storage system, some data blocks may be extremely hot, and an IO count value is extremely large, that is, M is an extremely large value. Because of a limitation of resources and a limitation of calculation performance, it is inappropriate to create an array in which a quantity of elements is M. The algorithm described above may be improved in the following specific manner:

When the storage node acquires an array in statistical information, each array element may be corresponding to one IO count interval, that is, an IO count value being in a range is corresponding to one array element. A size of the range may be determined according to a maximum IO count value M in the storage system and a quantity N of array elements. A size of the IO count interval is M/N, which is marked as T (abbreviation of the English word "interval"). Each array element is corresponding to an IO count interval whose size is T, that is, a quantity of data blocks with an IO count being in [1, T) is recorded in an element Array[0], a quantity of data blocks with an IO count being in [T, 2T) is recorded in an element Array[1], . . . , and a quantity of data blocks with an IO count being in [(N−1)*T, N*T) is recorded in an element Array[N−1]. After the monitoring information is traversed once, the array may be used to reflect the cold and hot data distribution status on the storage node.

The foregoing method may also be used to collect statistics on sequentiality, to obtain a statistical array of the sequentiality.

During statistics collection of the IO count field value, calculation may be further performed with reference to an IO read/write ratio. For example, if data write consumption of a data block is P times data read consumption of the data block, an equivalent quantity of IO read times may be calculated according to the read/write ratio and a quantity of IO accesses, and during subsequent calculation of the threshold, this equivalent quantity of IO times is used to perform calculation. Certainly, a factor of the read/write ratio may also not be considered, and each IO count field value is calculated only according to the quantity of IO accesses, that is, the equivalent quantity of IO times of the data block is obtained.

Step 303: Send the IO statistical information to the storage control server, where the IO statistical information includes at least one IO count field value.

After obtaining the IO statistical information, the storage node may send the IO statistical information to the storage control server by using the included hierarchical storage executor.

Step 304: Receive a identification threshold to distinguish cold data and hot data, sent by the storage control server, of the storage system, identify hot data and cold data according to the identification threshold to distinguish cold data and hot data, and implement hierarchical storage of the hot data and the cold data.

The storage node transmits the received threshold to the cold and hot data identification program of the storage node. According to the threshold, the cold and hot data identification program analyzes monitoring information of a local host, and then identifies hot data and cold data. Then, the hierarchical storage executor instructs the data migration program to migrate the hot data to a high performance tier and migrate the cold data to a low performance tier.

In this way, according to this embodiment of the present invention, data migration across storage nodes in a storage system may be implemented, which makes full use of performance advantages of all high performance storage mediums in the entire storage system, and meets, with a relatively low price, performance and capacity requirements of the storage system.

Figure 5:
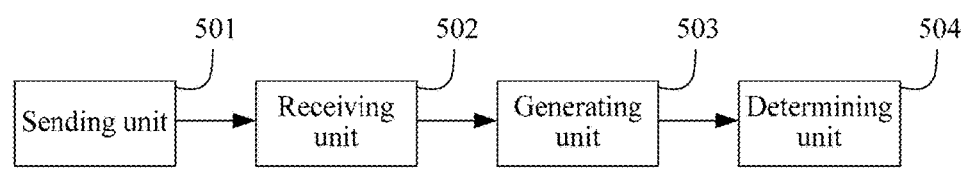
FIG. 5 is a schematic diagram of a storage control server according to an embodiment of the present invention.

Correspondingly, an embodiment of the present invention further provides a storage control server, where the storage control server is connected to multiple storage nodes, at least one of the storage nodes includes a hot data storage medium and a cold data storage medium, and the storage node stores a data block. FIG. 5 is a schematic diagram of a storage control server according to an embodiment of the present invention. As shown in the figure, this embodiment introduces the following functional units: a sending unit 501, a receiving unit 502, a generating unit 503, and a determining unit 504.

The sending unit 501 is configured to send an IO statistical information query command to each storage node in the multiple storage nodes.

In a storage system provided in this embodiment of the present invention, the storage control server may be located on a storage node, or may be independently located on a functional entity. In addition, a hierarchical storage executor program may be independently configured on each storage node and is used to communicate with the storage control server; or certainly, the executor program may not be configured, and the storage control server communicates with a data monitoring program, a cold and hot data identification program, and a data migration program on the storage node.

A storage system in which no hierarchical storage executor is configured on each storage node is used as an example in this embodiment of the present invention, to describe a technical solution of the present invention. However, the technical solution provided in this embodiment of the present invention is also applicable to the foregoing storage system in which the hierarchical storage executor is configured.

After the storage control server and the storage system form a network, the storage control server can communicate with a hierarchical storage executor on each storage node in the storage system. The storage control server determines time by itself to send the IO statistical information query command to the hierarchical storage executor, and then determines a cold and hot data identification criterion of the entire storage system according to IO statistical information fed back by each storage node.

A hierarchical storage executor program, a data monitoring program, a cold and hot data identification program and a data migration program all work inside a storage node, and have no relationship with another storage node. After a storage node receives host IO, the host IO does not need to be forwarded to another storage node, and is directly intercepted by a data monitoring program on the storage node, to generate corresponding monitoring information. Therefore, efficiency of hierarchical data storage is greatly improved.

The receiving unit 502 is configured to receive IO statistical information sent by each storage node, where the IO statistical information includes at least one IO count field value, and a quantity of data blocks with an IO count value being in each count range that are on the storage node that sends the IO statistical information is recorded in each IO count field value.

The IO statistical information includes multiple fields, where each field includes at least one field value. Each field may be implemented in a form of an array, and each field value is each array element in the array; or each field may be implemented in a form of a table, and each field value is content of each cell in the table. FIG. 4 is a schematic diagram of a statistical result of data on a storage node according to an embodiment of the present invention, and a statistical result in a form of a table is given in FIG. 4.

After receiving the IO statistical information query command, the storage control server of each storage node may instruct a data monitoring program to collect statistics on monitored IO information of a host in a segmented manner, to generate a statistical result with a relatively small data volume, that is, the IO statistical information. The information may reflect a general cold and hot data distribution status of the storage node.

Specifically, the storage node may collect statistics on an IO count and on sequentiality in monitoring information, to obtain the general cold and hot data distribution status of the storage node. That a field is implemented in a form of an array is used as an example in the following to describe a process in which an IO count field value in statistical information is obtained according to an IO count of a data block in monitoring information.

A maximum IO count value of each data block on the storage node is M, and when statistics is collected in a segmented manner, an array in which a quantity of elements is M may be created (a specific implementation manner is not limited), and monitoring information of the storage node is traversed. For example, if a quantity of data blocks with an IO count being 1 that are on the storage node is N1, a value of Array[0] is set to N1; if a quantity of data blocks with an IO count being 2 that are on the storage node is N2, a value of Array[2-1] is set to N2; . . . ; if a quantity of data blocks with an IO count being n that are on the storage node is Nn, a value of Array[n-1] is set to Nn; . . . ; if a quantity of data blocks with an IO count being M that are on the storage node is Nm, a value of Array[M-1] is set to Nm. After the monitoring information is traversed once, each value recorded in the array may reflect the cold and hot data distribution status on the storage node.

In the storage system, some data blocks may be extremely hot, and an IO count value is extremely large, that is, M is an extremely large value. Because of a limitation of resources and a limitation of calculation performance, it is inappropriate to create an array in which a quantity of elements is M. The algorithm described above may be improved in the following specific manner:

When the storage node acquires an array in statistical information, each array element may be corresponding to one IO count interval, that is, an IO count value being in a range is corresponding to one array element. A size of the range may be determined according to a maximum IO count value M in the storage system and a quantity N of array elements. A size of the IO count interval is M/N, which is marked as T (abbreviation of the English word "interval"). Each array element is corresponding to an IO count interval whose size is T, that is, a quantity of data blocks with an IO count being in [1, T) is recorded in an element Array[0], a quantity of data blocks with an IO count being in [T, 2T) is recorded in an element Array[1], . . . , and a quantity of data blocks with an IO count being in [(N-1)*T, N*T) is recorded in an element Array[N-1]. After the monitoring information is traversed once, the array may be used to reflect the cold and hot data distribution status on the storage node.

The foregoing is a method for calculating each IO count field value, where statistics on a sequentiality field and an IO read/write ratio may also be collected by using the foregoing method, to obtain each corresponding value.

During calculation of each IO count field value, calculation may be performed with reference to the IO read/write ratio. For example, if data write consumption of a data block is P times data read consumption of the data block, an equivalent quantity of IO read times may be calculated according to the read/write ratio and a quantity of IO accesses, and during subsequent calculation of a threshold, this equivalent quantity of IO times is used to perform calculation. Certainly, a factor of the read/write ratio may also not be considered, and each IO count field value is calculated only according to the quantity of IO accesses.

In this way, after the IO statistical information is obtained, the IO statistical information may be sent to the storage control server in the form described in FIG. 4.

The generating unit 503 is configured to perform an addition operation on IO count field values with IO count values being the same or IO count values being in one count range in the received IO statistical information of all the storage nodes, to generate statistical information of the IO count values in the IO statistical information in the storage system.

After receiving the IO statistical information of all the storage nodes, the storage control server may combine the statistical information of all the storage nodes, and calculate a identification threshold to distinguish cold data and hot data of the entire storage system.

Specifically, a method for combining the statistical information of all the storage nodes to obtain IO statistical information of the entire storage system is as follows: the storage control server may combine arrays Arrays returned by all the storage nodes, and a combining process is to create an array CArray in which a total quantity of elements is M. A value of each element in the CArray is a sum of values of elements corresponding to the Array returned by each storage node. It should be noted that, IO count statistics is used herein as a simple example for description, and how to generate a value of an element in the CArray by using multiple Arrays is determined by an implementer according to a specific requirement.

The determining unit 504 is configured to obtain, according to a total capacity of hot data storage mediums, a size of the data blocks, and the IO count statistical values on all the storage nodes and when the hot data storage mediums are filled with the data blocks corresponding to a large IO count statistical value, a minimum IO count value in a count range corresponding to a minimum IO count statistical value in the large IO count statistical value, and use the minimum IO count value as a identification threshold to distinguish cold data and hot data, where each IO count statistical value in the large IO count statistical values is not less than an IO count statistical value in a non-large IO count statistical value.

A purpose of identifying coldness and hotness of data is to migrate hot data to a high performance tier and place cold data to a low performance tier. If a capacity of the high performance tier can store X data blocks, X hottest data blocks are identified by using the threshold and placed in a hot data storage medium, and the other data blocks are placed in a cold data storage medium. Therefore, the capacity of the high performance tier and a size of data blocks that can be accommodated may be queried, and a quantity of data blocks that can be stored at the high performance tier is calculated.

Coldness and hotness of the data may be measured by using an IO count value, where a data block corresponding to large IO count statistical values is a hot data block, and a data block corresponding to a non-large IO count statistical values is a cold data block.

However, in actual implementation, it is not limited to use the IO count value to measure coldness and hotness of the data in the storage system, and a combination of multiple IO parameter values may be used. For example, an IO count threshold and the foregoing sequentiality value may be used together as a criterion for determining coldness and hotness of the data.

If arrays are traversed in descending order of subscripts in the CArray in the foregoing total statistical information, a subscript Index can be found, so that CArray[Index]+CArray[Index+1]+ . . . +CArray[M-1]=X. Therefore, an IO count value corresponding to the subscript Index may be used as the minimum IO count statistical value in the large IO count statistical value, that is, used as the identification threshold to distinguish cold data and hot data. If one array element is corresponding to one IO count interval and a minimum IO count value is to be determined according to the foregoing method for determining the minimum IO count statistical value, only an IO count interval corresponding to the minimum IO count statistical value can be determined, and a specific value cannot be determined. For example, only that the IO count threshold is in the IO count interval [T, 2T) can be determined, and a specific value cannot be determined. To determine the minimum IO count statistical value, an array Array2 (one element in the Array2 is corresponding to one sub-interval of the interval [T, 2T)) needs to be created, and statistics about a quantity of data blocks with a monitored count being in the interval [T, 2T) is collected into the Array2. If the threshold still cannot be precisely determined by combining the Array and the Array2, a new array may be continually created to collect statistics in a more precisely segmented manner, until the minimum IO count statistical value can be precisely determined.

Correspondingly, when combination of statistics collected in a segmented manner is performed by a hierarchical storage control center, combination of only arrays Arrays returned by storage nodes is not enough, an array sequence Array, Array2, Array3 . . . needs to be combined. An array sequence obtained after combination is used to finally determine the cold and hot identification threshold of the entire storage system.

The method provided in this embodiment of the present invention further includes: performing an addition operation on sequentiality field values in a same sequentiality range in the received IO statistical information of each the storage node, to generate a sequentiality statistical value corresponding to each sequentiality range.

Storage mediums with different attributes have different requirements for an IO sequentiality value. Therefore, a sequentiality threshold may be determined first according to attribute information of storage mediums in the storage system, that is, data may be placed in the hot data storage medium when a sequentiality value is greater than a value, where the value is determined according to sizes of various types of storage mediums in the storage system. If a solid-state disk in the storage system is relatively large, a relatively small sequentiality threshold may be set.

The IO count value used to measure coldness and hotness of the data is an extremely direct measurement criterion, and the IO count threshold is a criterion for determining coldness and hotness of the data. If the IO count threshold is an IO count value T, a data block with an IO count value being greater than T is hot data and should be placed in the hot data storage medium; if a data block with an IO count value being less than T, the data block is considered as cold data and should be placed in the cold data storage medium.

The storage control server sends the identification threshold to distinguish cold data and hot data obtained by means of calculation to the hierarchical storage executor of each storage node, and delivers a cold and hot data identification command and a data migration command to the hierarchical storage executor. The hierarchical storage executor transmits the received threshold to the cold and hot data identification program of the storage node. According to the threshold, the cold and hot data identification program analyzes monitoring information of a local host, and then identifies hot data and cold data. Then, the hierarchical storage executor instructs the data migration program to migrate the hot data to the hot data storage medium and migrate the cold data to the cold data storage medium.

Data migration may be performed inside the storage node, or may be performed in the entire storage system.

Preferably, the generating unit 503 is further configured to perform an addition operation on sequentiality field values in a same sequentiality range in the received IO statistical information of each the storage node, to generate a sequentiality statistical value corresponding to each sequentiality range.

The determining unit 504 is specifically configured to obtain, according to the total capacity of the hot data storage mediums, the size of the data blocks, the IO count statistical values, and the sequentiality statistical values in the storage system and when the hot data storage mediums are filled with the data blocks corresponding to the large IO count statistical value, the minimum IO count value in the count range corresponding to the minimum IO count statistical value in the large IO count statistical value, and use the minimum IO count value as the identification threshold to distinguish cold data and hot data.

In this way, according to this embodiment of the present invention, a identification threshold to distinguish cold data and hot data of an entire storage system may be obtained by collecting statistics on and calculating monitoring information that is within a time period and is of each storage node in the storage system. Therefore, all the storage nodes in the storage system have a uniform cold and hot identification criterion, and can, independently but cooperatively, implement hierarchical data storage in the entire storage system, and data migration across storage nodes in the storage system may be implemented, which makes full use of performance advantages of all high performance storage mediums in the entire storage system, and meets, with a relatively low price, performance and capacity requirements of the storage system.

Figure 6:
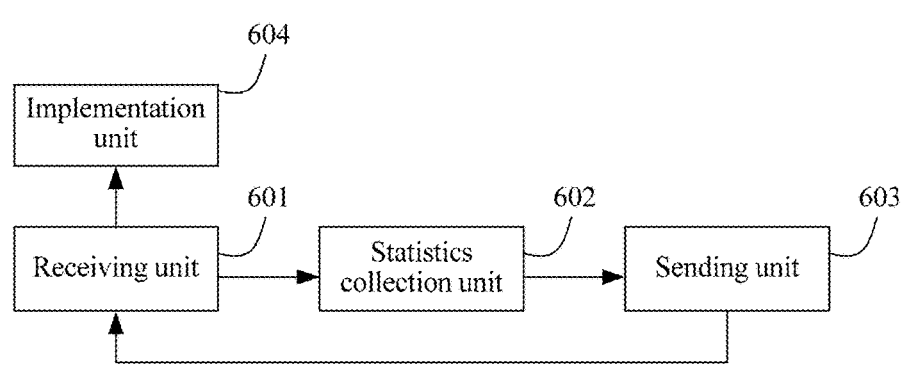
FIG. 6 is a schematic diagram of a storage node according to an embodiment of the present invention.

FIG. 6 is a schematic diagram of a storage node according to an embodiment of the present invention. Multiple storage nodes are connected to a storage control server, at least one of the storage nodes includes a hot data storage medium and a cold data storage medium, and the storage node stores a data block. As shown in the figure, the storage node provided in this embodiment of the present invention includes the following functional units: a receiving unit 601, a statistics collection unit 602, a sending unit 603, and an implementation unit 604.

The receiving unit 601 is configured to receive an IO statistical information query command sent by the storage control server.

To achieve a uniform cold and hot identification criterion in an entire storage system, after the storage control server and the storage system form a network, the storage control server can communicate with a hierarchical storage executor on each storage node in the storage system, and determines time by itself to send the IO statistical information query command to the hierarchical storage executor, to acquire IO statistical information of a host on each storage node, so that the receiving unit 601 in the storage node can receive the IO statistical information query command.

The statistics collection unit 602 is configured to collect statistics on an IO count in monitoring information of a data block on the local storage node in a segmented manner according to the IO statistical information query command, to obtain a quantity of data blocks with an IO count value being in each count range and use the quantity as an IO count field value.

The statistics collection unit 602 is specifically configured to collect statistics on the IO count of the data block on the local storage node according to an IO read/write ratio, to obtain each IO count field value in the IO statistical information.

A process in which the statistics collection unit 602 obtains each IO count field value in the IO statistical information by means of statistics specifically includes: calculating IO count values of the data block according to a quantity of IO accesses of the data block and the IO read/write ratio; acquiring a maximum IO count M of the data block on the local storage node; determining a quantity N of IO count field values; performing a division operation on the maximum IO count M and the quantity N of IO count field values to obtain the count range; and collecting statistics on a quantity of data blocks in each count range to obtain the N IO count field values.

After receiving the IO statistical information query command, the storage control server of each storage node may instruct a data monitoring program to collect statistics on monitored IO information of a host in a segmented manner, to generate a statistical result with a relatively small data volume, that is, IO statistical information. The IO statistical information includes multiple fields, where each field includes at least one field value. Each field may be implemented in a form of an array, and each field value is each array element in the array; or each field may be implemented in a form of a table, and each field value is content of each cell in the table. FIG. 4 is a schematic diagram of a statistical result of data on a storage node according to an embodiment of the present invention, and a statistical result in a form of a table is given in FIG. 4. The information may reflect a general cold and hot data distribution status of the storage node. Specifically, the storage node may collect statistics on an IO count and on sequentiality in monitoring information, to obtain the general cold and hot data distribution status of the storage node. That a field is implemented in a form of an array is used as an example in the following to describe a process in which an IO count field value in statistical information is obtained according to an IO count of a data block in monitoring information.

A maximum IO count value of each data block on the storage node is M, and when statistics is collected in a segmented manner, an array in which a quantity of elements is M may be created (a specific implementation manner is not limited), and monitoring information of the storage node is traversed. For example, if a quantity of data blocks with an IO count being 1 that are on the storage node is N1, a value of Array[0] is set to N1; if a quantity of data blocks with an IO count being 2 that are on the storage node is N2, a value of Array[2-1] is set to N2; . . . ; if a quantity of data blocks with an IO count being n that are on the storage node is Nn, a value of Array[n−1] is set to Nn; . . . ; if a quantity of data blocks with an IO count being M that are on the storage node is Nm, a value of Array[M−1] is set to Nm. After the monitoring information is traversed once, each value recorded in the array may reflect the cold and hot data distribution status on the storage node.

In the storage system, some data blocks may be extremely hot, and an IO count value is extremely large, that is, M is an extremely large value. Because of a limitation of resources and a limitation of calculation performance, it is inappropriate to create an array in which a quantity of elements is M. The algorithm described above may be improved in the following specific manner:

When the storage node acquires an array in statistical information, each array element may be corresponding to one IO count interval, that is, an IO count value being in a range is corresponding to one array element. A size of the range may be determined according to a maximum IO count value M in the storage system and a quantity N of array elements. A size of the IO count interval is M/N, which is marked as T (abbreviation of the English word "interval"). Each array element is corresponding to an IO count interval whose size is T, that is, a quantity of data blocks with an IO count being in [1, T) is recorded in an element Array[0], a quantity of data blocks with an IO count being in [T, 2T) is recorded in an element Array[1], . . . , and a quantity of data blocks with an IO count being in [(N−1)*T, N*T) is recorded in an element Array[N−1]. After the monitoring information is traversed once, the array may be used to reflect the cold and hot data distribution status on the storage node.

The foregoing method may also be used to collect statistics on sequentiality, to obtain a statistical array of the sequentiality.

During statistics collection of the IO count field value, calculation may be further performed with reference to the IO read/write ratio. For example, if data write consumption of a data block is P times data read consumption of the data block, an equivalent quantity of IO read times may be calculated according to the read/write ratio and a quantity of IO accesses, and during subsequent calculation of a threshold, this equivalent quantity of IO times is used to perform calculation. Certainly, a factor of the read/write ratio may also not be considered, and each IO count field value is calculated only according to the quantity of IO accesses, that is, an equivalent IO count of the data block is obtained.

The sending unit 603 is configured to send the IO statistical information to the storage control server, where the IO statistical information includes at least one IO count field value.

The receiving unit 601 is further configured to receive a identification threshold to distinguish cold data and hot data, sent by the storage control server, of the storage system.

The implementation unit 604 is configured to: identify hot data and cold data according to the identification threshold to distinguish cold data and hot data, and implement hierarchical storage of the hot data and the cold data.

The storage node transmits the received threshold to the cold and hot data identification program of the storage node. According to the threshold, the cold and hot data identification program analyzes monitoring information of a local host, and then identifies hot data and cold data. Then, the hierarchical storage executor instructs the data migration program to migrate the hot data to a high performance tier and migrate the cold data to a low performance tier.

In this way, according to this embodiment of the present invention, data migration across storage nodes in a storage system may be implemented, which makes full use of performance advantages of all high performance storage mediums in the entire storage system, and meets, with a relatively low price, performance and capacity requirements of the storage system.

Figure 7:
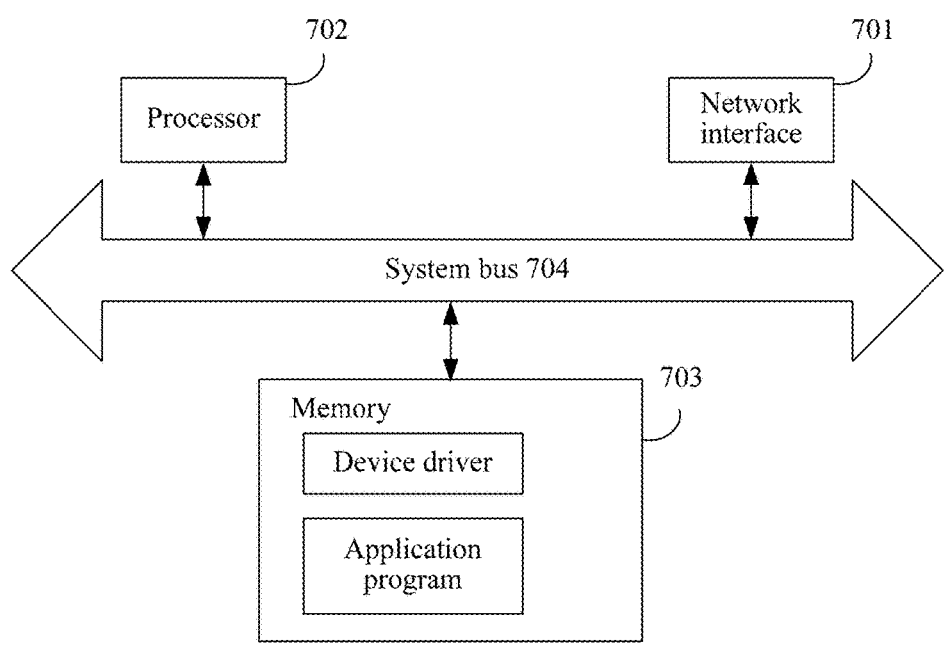
FIG. 7 is a schematic diagram of another storage control server according to an embodiment of the present invention.

Correspondingly, an embodiment of the present invention further provides a storage control server. FIG. 7 is a schematic diagram of another storage control server according to an embodiment of the present invention. As shown in the figure, this embodiment of the storage control server includes a network interface 701, a processor 702, and a memory 703. A system bus 704 is configured to connect the network interface 701, the processor 702, and the memory 703.

The network interface 701 is configured to communicate with a storage node.

The memory 703 may be a permanent memory, for example, a hard disk drive or a flash memory, and the memory 703 has an application program and a device driver. The application program is used to execute the foregoing technical solutions of the present invention, and the device driver may be a network and interface driver.

Upon startup, the application program is loaded into the memory 703 and then is accessed by the processor 702. The processor 70 performs the following instructions:

sending an IO statistical information query command for the data block to each storage node;

receiving IO statistical information sent by each storage node, where the IO statistical information includes at least one IO count field value, and a quantity of data blocks with an IO count value being in each count range that are on the storage node that sends the IO statistical information is recorded in each IO count field value;

performing an addition operation on IO count field values in a same count range in the received IO statistical information of all the storage nodes, to generate an IO count statistical value corresponding to each count range; and obtaining, according to a total capacity of hot data storage mediums, a size of the data blocks, and the IO count statistical values on all the storage nodes and when the hot data storage mediums are filled with the data blocks corresponding to a large IO count statistical value, a minimum IO count value in a count range corresponding to a minimum IO count statistical value in the large IO count statistical value, and using the minimum IO count value as a identification threshold to distinguish cold data and hot data, where each IO count statistical value in the large IO count statistical values is not less than an IO count statistical value in a non-large IO count statistical value.

The IO statistical information further includes at least one sequentiality field value, and a quantity of data blocks with a sequentiality value being in each sequentiality range that are on the storage node that sends the IO statistical information is recorded in each sequentiality field value.

Further, the processor 702 may further perform an instruction of performing an addition operation on sequentiality field values in a same sequentiality range in the received IO statistical information of each the storage node, to generate a sequentiality statistical value corresponding to each sequentiality range.

The processor 702 obtains, according to the total capacity of the hot data storage mediums, the size of the data blocks, the IO count statistical values, and the sequentiality statistical values in the storage system and when the hot data storage mediums are filled with the data blocks corresponding to the large IO count statistical value, the minimum IO count value in the count range corresponding to the minimum IO count statistical value in the large IO count statistical value, and uses the minimum IO count value as the identification threshold to distinguish cold data and hot data.

In this way, data migration across storage nodes in a storage system may be implemented, which makes full use of performance advantages of all high performance storage mediums in the entire storage system, and meets, with a relatively low price, performance and capacity requirements of the storage system.

Figure 8:
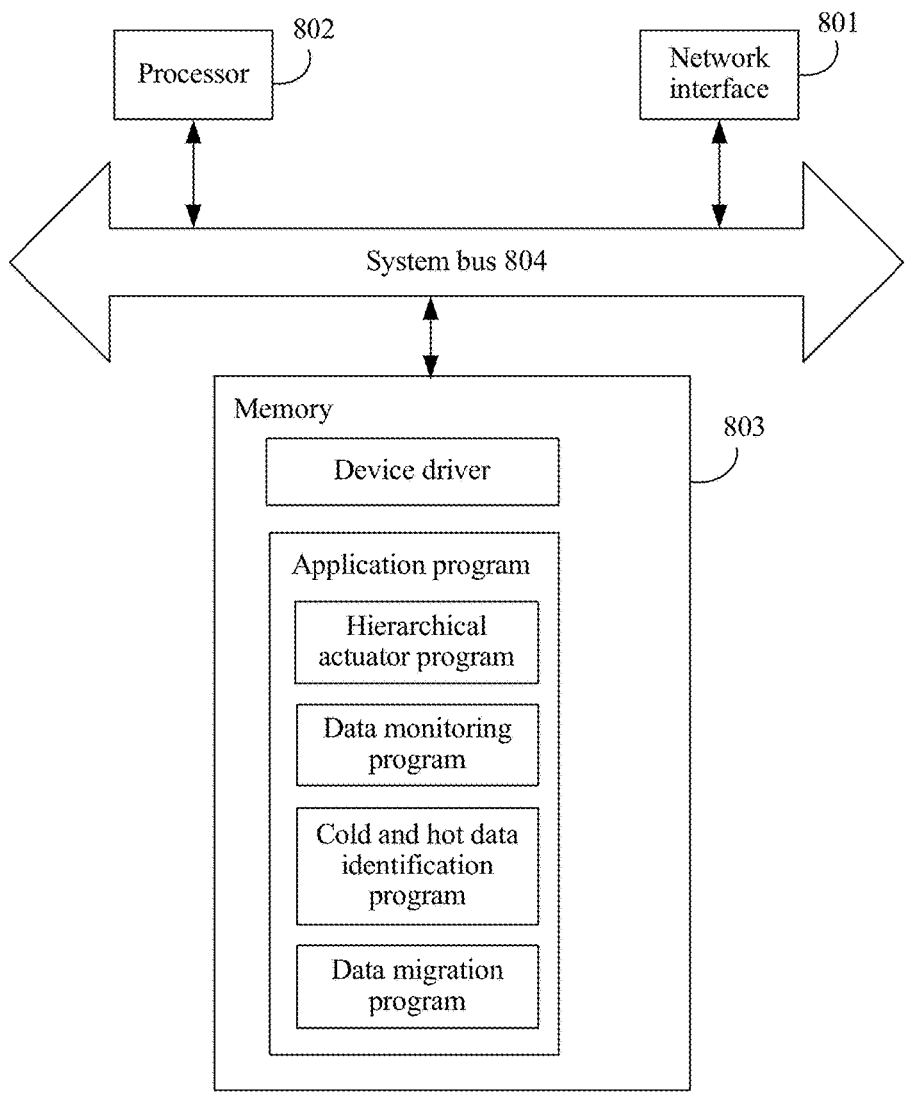
FIG. 8 is a schematic diagram of another storage node according to an embodiment of the present invention.

Correspondingly, an embodiment of the present invention further provides a storage node. FIG. 8 is a schematic diagram of another storage node according to an embodiment of the present invention. As shown in the figure, the storage node in this embodiment includes a network interface 801, a processor 802, and a memory 803. A system bus 804 is configured to connect the network interface 801, the processor 802, and the memory 803.

The network interface 801 is configured to communicate with a storage node.

The memory 803 may be a permanent memory, for example, a hard disk drive and a flash memory, and the memory 803 has an application program and a device driver. The application program may include a hierarchical storage executor program, a data monitoring program, a cold and hot data identification program, a data migration program, and the like, which are used to execute the foregoing technical solutions of the present invention. The device driver may be a network and interface driver.

Upon startup, the application program is loaded into the memory 803 and then is accessed by the processor 802. The processor 802 perform the following instructions:

receiving an IO statistical information query command sent by the storage control server;

collecting statistics on an IO count in monitoring information of a data block on the local storage node in a segmented manner according to the IO statistical information query command, to obtain a quantity of data blocks with an IO count value being in each count range and use the quantity as an IO count field value;

sending the IO statistical information to the storage control server, where the IO statistical information includes at least one IO count field value; and receiving a identification threshold to distinguish cold data and hot data, sent by the storage control server, of a storage system, identifying hot data and cold data according to the identification threshold to distinguish cold data and hot data, and implementing hierarchical storage of the hot data and the cold data.

The monitoring information further includes IO sequentiality of the data block or an IO read/write ratio of the data block, the sequentiality is a ratio of a sequential IO count to a total IO count of each data block, the IO read/write ratio is a ratio of a quantity of IO read operations to a quantity of IO write operations of each data block, and the IO statistical information further includes at least one sequentiality field value, where a quantity of data blocks with a sequentiality value being in each sequentiality range that are on the local storage node is recorded in each sequentiality field value.

Further, a process in which the processor 802 collects statistics on the IO count in the monitoring information of the data block on the local storage node in the segmented manner, to obtain the quantity of data blocks with the IO count value being in each count range and use the quantity as the IO count field value specifically includes: collecting statistics on the IO count of the data block on the local storage node according to the IO read/write ratio, to obtain each IO count field value in the IO statistical information.

Further, a process in which the processor 802 collects statistics on the IO count of the data block on the local storage node according to the IO read/write ratio, to obtain each IO count field value in the IO statistical information is specifically:

calculating IO count values of the data block according to a quantity of IO accesses in the data block and the IO read/write ratio;

acquiring a maximum IO count M of the data block on the local storage node;

determining a quantity N of IO count field values;

performing a division operation on the maximum IO count M and the quantity N of IO count field values to obtain the count range; and collecting statistics on a quantity of data blocks in each count range to obtain the N IO count field values.

In this way, according to this embodiment of the present invention, data migration across storage nodes in a storage system may be implemented, which makes full use of performance advantages of all high performance storage mediums in the entire storage system, and meets, with a relatively low price, performance and capacity requirements of the storage system.

Correspondingly, an embodiment of the present invention further provides a storage system, where the method for calculating a identification threshold to distinguish cold data and hot data in the embodiments of the present invention is embedded in the system. The system includes the foregoing storage control server and multiple storage nodes, where the storage control server is connected to the multiple storage nodes, at least one of the storage nodes includes a hot data storage medium and a cold data storage medium, and the storage node stores a data block. The storage control server sends an IO statistical information query command for the data block to each storage node; receives IO statistical information sent by each storage node, where the IO statistical information includes at least one IO count field value, and a quantity of data blocks with an IO count value being in each count range that are on the storage node that sends the IO statistical information is recorded in each IO count field value; performs an addition operation on IO count field values in a same count range in the received IO statistical information of all the storage nodes, to generate an IO count statistical value corresponding to each count range; and obtains, according to a total capacity of hot data storage mediums, a size of the data blocks, and the IO count statistical values on all the storage nodes and when the hot data storage mediums are filled with the data blocks corresponding to a large IO count statistical value, a minimum IO count value in a count range corresponding to a minimum IO count statistical value in the large IO count statistical value, and uses the minimum IO count value as a identification threshold to distinguish cold data and hot data, where each IO count statistical value in the large IO count statistical values is not less than an IO count statistical value in a non-large IO count statistical value. In this way, according to the storage system provided in this embodiment of the present invention, all storage nodes in the storage system have a uniform cold and hot identification criterion, and can, independently but cooperatively, implement hierarchical data storage in the entire storage system, and data migration across storage nodes in the storage system may be implemented, which makes full use of performance advantages of all high performance storage mediums in the entire storage system, and meets, with a relatively low price, performance and capacity requirements of the storage system. Therefore, the storage system provided in this embodiment of the present invention also falls within the protection scope of the embodiments of the present invention.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that such implementation goes beyond the scope of the present invention.

Steps of methods or algorithms described in the embodiments disclosed in this specification may be implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable storage medium, a CD-ROM, or a storage medium in any other forms well-known in the art.

In the foregoing specific implementation manners, the objectives, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention shall fall within the protection scope of the present invention.

What is claimed is:

1. A method for calculating an identification threshold to distinguish cold data and hot data, wherein a storage control server is connected to multiple storage nodes, at least one of the storage nodes comprises a hot data storage medium and a cold data storage medium, each storage node stores a data block, and the storage control server performs the following steps:
    sending an IO statistical information query command for the data block to each storage node;
    receiving IO statistical information from each storage node, wherein the IO statistical information comprises at least one IO count field, a value of the IO count field indicates a quantity of blocks meet an IO count range, wherein the IO count range is a range of values of an IO count;
    calculating an identification threshold to distinguish hot data blocks and cold data blocks, according to a total capacity of hot data storage mediums, a size of the data blocks, and the IO count statistical values received from the multiple storage nodes; and
    sending the identification threshold to each of the multiple storage nodes, so that a first storage node of the multiple storage nodes migrates blocks to a second storage node of the multiple storage nodes according to the identification threshold.

2. A method for calculating an identification threshold to distinguish cold data and hot data, wherein a storage control server is connected to multiple storage nodes, at least one of the storage nodes comprises a hot data storage medium and a cold data storage medium, each storage node stores a data block, and the storage control server performs the following steps:
    sending an IO statistical information query command for the data block to each storage node;
    receiving IO statistical information from each storage node, wherein the IO statistical information comprises at least one IO count field, a value of the IO count field indicates a quantity of blocks meet an IO count range, wherein the IO count range is a range of values of an IO count;
    wherein the IO statistical information further comprises at least one sequentiality field, a block with a value of the sequentiality field greater than a sequentiality threshold is classified as cold data block;
    calculating an identification threshold to distinguish hot data blocks and cold data blocks, according to a total capacity of hot data storage mediums, a size of the data blocks, and the IO statistical information received from the multiple storage nodes; and
    sending the identification threshold to each of the multiple storage nodes, so that a first storage node migrates blocks to a second storage node according to the identification threshold.

3. A method for migrating data blocks, wherein a storage control server is connected to a first storage node and a second node, at least one of the first storage node and the second storage node comprises a hot data storage medium and a cold data storage medium, each storage node stores a data block, and the first storage node performs the following steps:

receiving an IO statistical information query command from the storage control server;

sending IO statistical information to the storage control server, wherein the IO statistical information comprises at least one IO count field, a value of the IO count field indicates a quantity of blocks meet an IO count range, wherein the IO count range is a range of values of an IO count; and receiving an identification threshold to distinguish cold data and hot data, sent by the storage control server, migrating data blocks from the first storage node to the second storage node according to the identification threshold.

4. A method for migrating data blocks, wherein a storage control server is connected to a first storage node and second node, the second storage node, at least one of the first storage node and the second storage node comprises a hot data storage medium and a cold data storage medium, each storage node stores a data block, and the first storage node performs the following steps:

receiving an IO statistical information query command from the storage control server;

sending IO statistical information to the storage control server, wherein the IO statistical information comprises at least one IO count field, a value of the IO count field indicates a quantity of blocks meet an IO count range, wherein the IO count range is a range of values of an IO count;

wherein the IO statistical information further comprises at least one sequentiality field, a block with value of the sequentiality field greater than a sequentiality threshold is classified as cold data block; and receiving an identification threshold to distinguish cold data and hot data, sent by the storage control server, and migrating data blocks from the first storage node to the second storage node according to the identification threshold.

5. A storage control server, the storage control server comprises a processor and an interface, wherein the storage control server is connected to multiple storage nodes with the interface, at least one of the storage nodes comprises a hot data storage medium and a cold data storage medium, each storage node stores a data block, the storage control server is configured to perform the following steps:

sending an IO statistical information query command for the data block to each storage node;

receiving IO statistical information from each storage node, wherein the IO statistical information comprises at least one IO count field, a value of the IO count field indicates a quantity of blocks meet an IO count range, wherein the IO count range is a range of values of an IO count;

calculating an identification threshold to distinguish hot data blocks and cold data blocks, according to a total capacity of hot data storage mediums, a size of the data blocks, and the IO count statistical values received from the multiple storage nodes; and sending the identification threshold to each of the multiple storage nodes, so that a first storage node migrates blocks to a second storage node according to the identification threshold.

6. A storage control server, the storage control server comprises a processor and an interface, wherein the storage control server is connected to multiple storage nodes with the interface, at least one of the storage nodes comprises a hot data storage medium and a cold data storage medium, each storage node stores a data block, the storage control server is configured to perform the following steps:

sending an IO statistical information query command for the data block to each storage node;

receiving IO statistical information from each storage node, wherein the IO statistical information comprises at least one IO count field, a value of the IO count field indicates a quantity of blocks meet an IO count range, wherein the IO count range is a range of values of an IO count;

wherein the IO statistical information further comprises at least one sequentiality field, a block with value of the sequentiality field greater than a sequentiality threshold is classified as cold data block;

calculating an identification threshold to distinguish hot data blocks and cold data blocks, according to the total capacity of the hot data storage mediums, the size of the data blocks, and the IO statistical information received from the multiple storage nodes; and sending the identification threshold to each of the multiple storage nodes, so that a first storage node migrates blocks to a second storage node according to the identification threshold.

7. A first storage node, comprises a processor and an interface, the first storage node and a second node are connected to a storage control server with the interface, at least one of the first storage node and the second the storage node comprises a hot data storage medium and a cold data storage medium, the first storage node stores a data block, and the first storage node is configured to perform the following steps:

receiving an IO statistical information query command sent by the storage control server;

sending IO statistical information to the storage control server, wherein the IO statistical information comprises at least one IO count field, a value of the IO count field indicates a quantity of blocks meet an IO count range, wherein the IO count range is a range of values of an IO count; and receiving an identification threshold to distinguish cold data and hot data, sent by the storage control server, of a storage system, migrating data blocks from the first storage node to the second storage node according to the identification threshold.

8. A first storage node, comprises a processor and an interface, wherein the first storage node and a second storage nodes are connected to a storage control server with the interface, at least one of the first storage node and the second storage node comprises a hot data storage medium and a cold data storage medium, the storage node stores a data block, and the first storage node is configured to perform the following steps:

receiving an IO statistical information query command from the storage control server;

sending IO statistical information to the storage control server, wherein the IO statistical information comprises at least one IO count field, a value of the IO count field indicates a quantity of blocks meet an IO count range, wherein the IO count range is a range of values of an IO count;

wherein the IO statistical information further comprises at least one sequentiality field, a block with value of the sequentiality field greater than a sequentiality threshold is classified as cold data block;

receiving an identification threshold to distinguish cold data and hot data, sent by the storage control server, and migrating data blocks from the first storage node to the second storage node according to the identification threshold.

9. A storage system, wherein the system comprises a storage control server and multiple storage nodes, wherein the control server is configured:

send an IO statistical information query command for the data block to each storage node;

receive IO statistical information sent by each storage node, wherein the IO statistical information comprises at least one IO count field, a value of the IO count field indicates a quantity of blocks meet an IO count range, wherein the IO count range is a range of values of an IO count;

calculate an identification threshold to distinguish hot data blocks and cold data blocks, according to a total capacity of hot data storage mediums, a size of the data blocks, and the IO count statistical values received from the multiple storage nodes; and sending the identification threshold to each of the multiple storage nodes, so that a first storage node migrates blocks to a second storage node according to the identification threshold.

* * * * *